May 1, 1923.
R. WARE
MECHANICAL MOVEMENT
Filed March 16, 1920
1,453,815
2 Sheets-Sheet 1
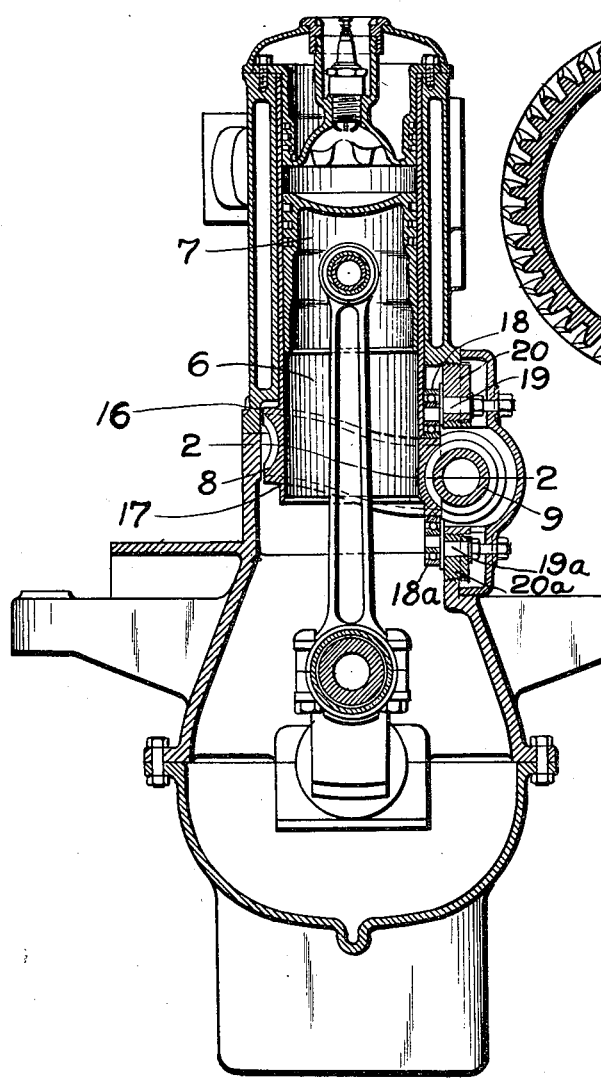
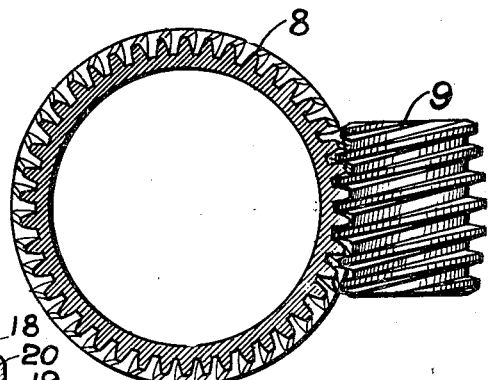
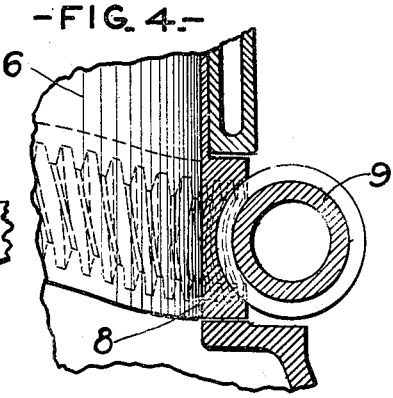
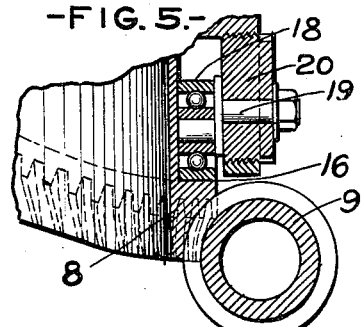
INVENTOR
Raymond Ware.
BY
Edward A. Wright.
ATTORNEY

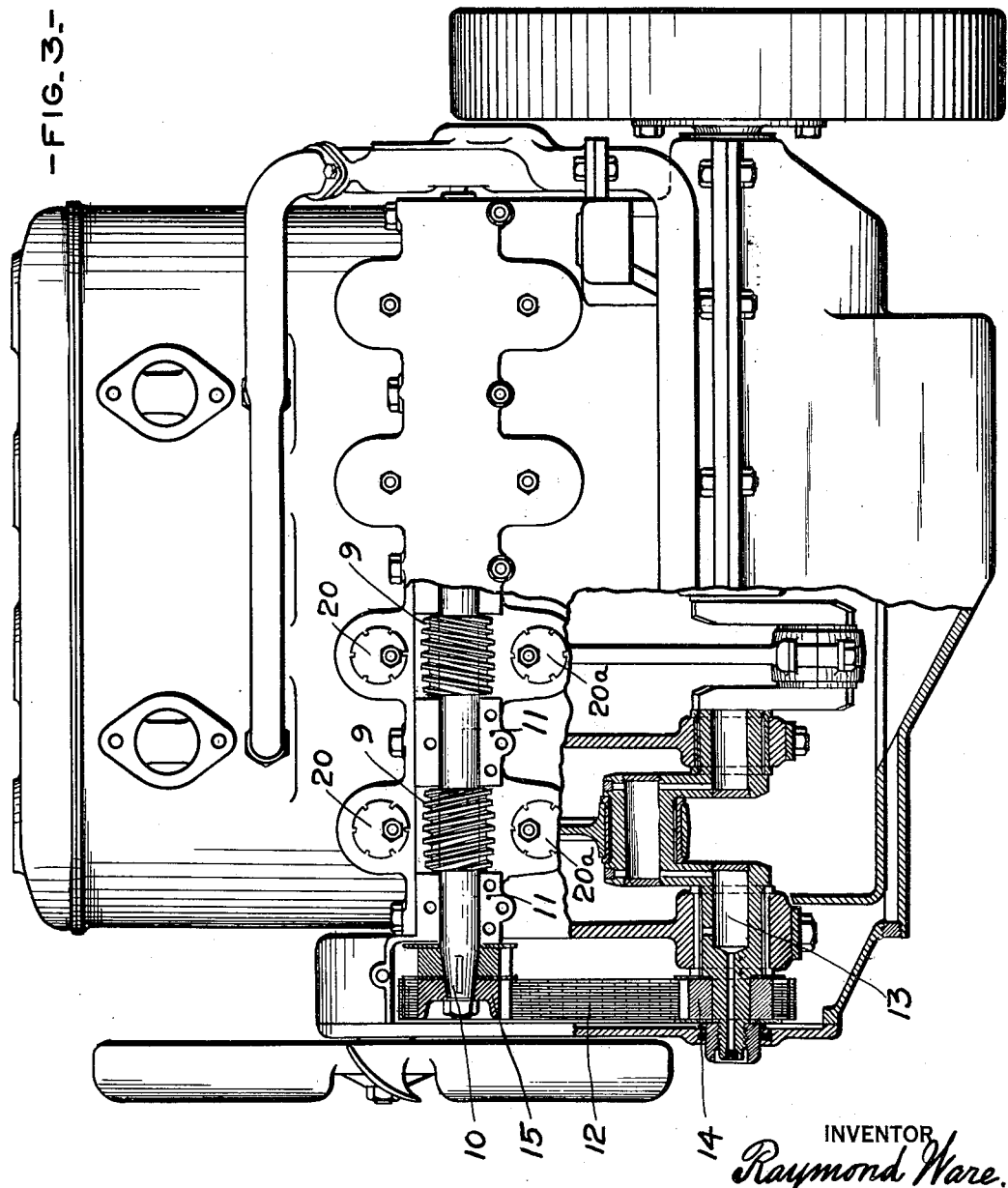

Patented May 1, 1923.

1,453,815

UNITED STATES PATENT OFFICE.

RAYMOND WARE, OF ITHACA, NEW YORK.

MECHANICAL MOVEMENT.

Application filed March 16, 1920. Serial No. 366,227.

*To all whom it may concern:*

Be it known that I, RAYMOND WARE, a citizen of the United States, residing at Ithaca, in the county of Tompkins and State of New York, have invented a certain new and useful Improvement in Mechanical Movements, of which improvement the following is a specification.

This invention relates to a mechanism for producing a combined rotary and reciprocatory movement, which may be used for various purposes, as, for instance, to transmit a rotary and reciprocating movement to a valve of an engine from a rotary shaft. My improvement comprises a worm operated by a rotary shaft, or other element, and having helical or screw threads of the desired pitch, formed on its convex or cylindrical face, the worm meshing with a corresponding threaded wheel or surface on the valve, or other element to be reciprocated, the threaded portion of the wheel or other element being formed in a groove or concave face extending around and also longitudinally of the wheel or other part to be reciprocated.

While my improvement may be employed for transmitting a combined rotary and reciprocatory motion to various elements, I have illustrated the same as applied to a sleeve valve of a gas engine, in the accompanying drawings, in which Figure 1 is a vertical section of an internal combustion engine having a sleeve valve operated by my improvement; Fig. 2, a substantially horizontal section of the worm wheel portion of the sleeve valve, taken on the line 2—2 of Fig. 1, with the worm shown in plan; Fig. 3, a side elevation of the engine, with a part broken away, and showing, in section, the driving connections for rotating the worm shaft; Fig. 4, a detail view, showing a modification; and, Fig. 5, a similar view showing another modification.

According to the construction shown, the engine is of the same general type as that covered by my prior Patent No. 1,107,468, of August 18, 1914, in which the valve for each cylinder is in the form of a hollow sleeve, 6, comprising a lining for the cylinder, and containing the piston, 7. In accordance with my present improvement, the valve is provided at its lower end with a worm wheel, 8, having its concave toothed or threaded portion formed upon a recess or groove extending completely around and also longitudinally of the axis of the valve. This longitudinal distance or pitch of the curved groove or recess is equal to the desired longitudinal movement of the valve at each revolution. This curved threaded portion of the wheel meshes with the corresponding toothed or threaded worm, 9, fixed on a shaft, 10, mounted to rotate in bearings, 11. The intermeshing teeth or threaded portions of the worm and worm wheel are curved to a more or less helical form, and the worm projects within the groove or recess in the wheel, so that the rotation of the worm causes both a rotation and a longitudinal movement of the worm wheel and valve.

The worm shaft, 10, may be driven in any suitable manner, from the engine crank shaft, 13, as, for instance, by a drive chain, 12, and sprocket gears, 14 and 15, as shown in Fig. 3. The engine may comprise any number of cylinders, there being four cylinders shown in the drawing, and a worm, 9, on the shaft, 10, for each cylinder.

If preferred, there may also be provided an annular cam surface, 16, at the top, and another similar surface, 17, at the bottom of the worm wheel, for engaging the respective guiding rollers, 18 and 18$^a$, for assisting in the longitudinal or reciprocating movement of the valve, in a manner similar to that described in my prior patent above referred to. In the present instance, however, the rollers are mounted on the pins, 19 and 19$^a$, respectively, supported in the threaded plugs or covers, 20 and 20$^a$, which are screwed into corresponding openings in the engine frame or casing above and below each worm. The pins, 19 and 19$^a$, are each formed in two sections offset to each other, the roller turning on one section while the other section is mounted in the plug but eccentric thereto so that by turning the pin to a given position, the roller may be taken out through the opening. By means of the offset feature of the two sections of the pin, the position of the roller relative to its annular cam surface may be readily adjusted by turning the outer section of the pin and clamping the same in the desired position in its threaded plug or cover.

Where the worm engages the worm wheel by projecting into the curved recess or groove which extends entirely around the wheel and also longitudinally of the axis of the valve, it will be seen that there will be such action between the intermeshing surfaces of the worm and the wheel as to produce both the rotary and reciprocating movements of the valve, and that the same may operate satisfactorily without the use of the guiding rollers, 18 and 18ª, for the cam surfaces of the wheel. These may, therefore, be eliminated, as indicated in the modification shown in Fig. 4.

According to a preferred construction, the thread of the worm is adapted to engage the threads of the wheel in such a manner as to produce, not only a rotation of the latter, but also a vertical thrust which forces the cam guiding surface against the guide or roller with more or less pressure according to the resistance to movement offered by the sleeve, which may vary at different points in the revolution. The bearing of the roller against the guiding surface may be adjusted by means of the pin, 19, to give the desired clearance between the worm and the worm wheel. In this way the thrust action pressing the cam surface against the roller may be positive throughout a complete revolution, thereby eliminating any lost motion or "back lash" when passing over the centre, and producing a smooth and steady running mechanism. With such a construction so designed as to exert a continuous thrust against the upper guide roller, the lower half of the threaded portion of the groove upon the wheel would be unnecessary, and may be cut away, as shown in the modification, Fig. 5, in which there may be a continuous upward thrust of the cam surface, 16, against the roller, 18, throughout the complete revolution of the valve.

While I have described my improvement particularly as applicable to the movement of an engine valve, it is to be understood that it is not in any wise limited to such a construction, but may be employed in various combinations, and wherever it is desired to produce a continuous rotation and reciprocation of one element from a rotating shaft or element.

Having now described my invention, what I claim as new and desire to secure by Letters Patent is:

1. The combination with a rotatable worm, of a rotatable and reciprocable worm wheel having a recessed threaded surface extending around and longitudinally of the axis of said wheel and meshing with said worm to produce both rotary and longitudinal movement of said wheel.

2. The combination with a rotatable worm, of a rotatable and reciprocatable worm wheel having a groove extending around and longitudinally of the axis of the wheel, and provided with threads meshing with said worm to produce both rotary and longitudinal movement of said wheel.

3. The combination with a rotatable worm, of a rotatable and reciprocatable worm wheel having a recessed threaded surface extending around and longitudinally of the axis of said wheel and meshing with said worm to produce both rotary and longitudinal movement of said wheel, a cam face on the wheel and a guiding means bearing against said cam face.

4. The combination with a rotatable worm, of a worm wheel movable longitudinally on its axis of rotation and having a recessed threaded portion extending completely around said wheel, the toothed portion of the worm projecting within said recess, and meshing with the threaded portion of the wheel to produce both rotary and longitudinal movement of said wheel.

5. The combination with a rotatable worm, of a worm wheel movable longitudinally on its axis of rotation, and having a groove extending completely around and also longitudinally of the wheel, said groove being provided with curved teeth or threads and meshing with the corresponding toothed portion of the worm to produce both rotary and longitudinal movement of said wheel.

6. The combination with a rotatable worm, of a worm wheel movable longitudinally on its axis of rotation, and having a helical recess extending completely around the same, said recess being provided with curved teeth or threads and meshing with the threaded portion of the worm to produce both rotary and longitudinal movement of said wheel, a cam face extending completely around said wheel, and a guide roller bearing against said cam face.

7. The combination with a rotatable worm, of a worm wheel movable longitudinally on its axis of rotation, and having a helical recess extending completely around the same, said recess being provided with curved teeth or threads and meshing with the threaded portion of the worm to produce both rotary and longitudinal movement of said wheel, a cam face extending completely around said wheel, a guide roller bearing against the said cam face, and means for adjusting said roller.

In testimony whereof I have hereunto set my hand.

RAYMOND WARE.